(12) United States Patent
Hayakawa

(10) Patent No.: US 10,921,544 B2
(45) Date of Patent: Feb. 16, 2021

(54) LENS APPARATUS AND IMAGING APPARATUS

(71) Applicant: CANON KABUSHIKI KAISHA, Tokyo (JP)

(72) Inventor: Makoto Hayakawa, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 76 days.

(21) Appl. No.: 16/385,493

(22) Filed: Apr. 16, 2019

(65) Prior Publication Data
US 2019/0324227 A1 Oct. 24, 2019

(30) Foreign Application Priority Data

Apr. 19, 2018 (JP) ................. 2018-080360

(51) Int. Cl.
*G02B 7/04* (2006.01)
*G02B 7/08* (2021.01)
*G02B 27/64* (2006.01)

(52) U.S. Cl.
CPC ............. *G02B 7/08* (2013.01); *G02B 27/642* (2013.01)

(58) Field of Classification Search
CPC combination set(s) only.
See application file for complete search history.

(56) References Cited

U.S. PATENT DOCUMENTS 6,008,958 A * 12/1999 Ishikawa .................. G02B 7/08
359/626

FOREIGN PATENT DOCUMENTS

| JP | H02253213 A | 10/1990 |
| JP | H09251125 A | 9/1997 |
| JP | 2014018016 A | 1/2014 |
| JP | 2014087146 A | 5/2014 |
| JP | 2016103977 A | 6/2016 |

OTHER PUBLICATIONS

Notice of Reasons for Rejection issued by the Japanese Patent Office dated Mar. 31, 2020 in corresponding Japanese Patent Application No. 2018-080360, with English translation.

* cited by examiner

*Primary Examiner* — Joseph P Martinez
(74) *Attorney, Agent, or Firm* — Carter, Deluca & Farrell, LLP

(57) ABSTRACT

A lens apparatus includes a rotator configured to rotate around the optical axis direction when contacting the vibrator, a biasing member configured to bias the vibrator from a first side to a second side in the optical axis direction so as to compressively bring the vibrator into contact with the rotator, and a driving ring configured to receive a rotation of the rotator, to rotate around the optical axis direction relative to the fixed lens barrel, and to move the lens unit in the optical axis direction. The fixed lens barrel includes a receiver configured to receive the biasing force of the biasing member transmitted to the driving ring via the rotator. The receiver is provided inside the vibrator and the rotator in the radial direction and on the first side of the end of the driving ring on the second side.

7 Claims, 9 Drawing Sheets

LENS APPARATUS AND IMAGING APPARATUS

BACKGROUND OF THE INVENTION

Field of the Invention

The present invention relates to a lens apparatus configured to move a lens unit using a rotational force generated by a vibration type motor.

Description of the Related Art

One of the above lens apparatuses transmits a rotation of a rotator (rotor) in a vibration type motor to a driving ring (cam ring), and converts a rotation of the driving ring into a movement in an optical axis direction of the lens unit, as disclosed in Japanese Patent Laid-Open No. ("JP") 9-251125.

The lens apparatus disclosed in JP 9-251125 provides a pressure spring for generating a biasing force for compressively bringing a vibrator (stator) in the vibration type motor into contact with the rotor. The biasing force of the pressure spring is transmitted to the stator, the rotor, and the driving ring in order from an image side to an object side, and is received by a bearing structure provided between the end of the driving ring on the object side and the fixed lens barrel.

However, the bearing structure provided at the end of the driving ring on the object side (or on the side opposite to the vibration type motor in the optical axis direction) as in the lens apparatus in JP 9-251125 would increase the length of the lens apparatus in the optical axis direction.

SUMMARY OF THE INVENTION

The present invention provides a compact lens apparatus and an imaging apparatus having the same, each of which is configured to receive a biasing force for compressively bringing a vibrator and a rotator into contact with each other in a vibrating motor.

A lens apparatus according to one aspect of the present invention includes a fixed barrel, a lens unit provided inside the fixed lens barrel in a radial direction and movable in an optical axis direction of the lens unit, a vibrator configured to generate a vibration excited by an electromechanical energy conversion, a rotator configured to rotate around the optical axis direction in a case that the rotator contacts the vibrator vibrated, a biasing member configured to bias the vibrator from a first side to a second side in the optical axis direction so as to bring the vibrator into compressive contact with the rotator, and a driving ring configured to receive a rotation of the rotator, to rotate around the optical axis direction relative to the fixed lens barrel, and to move the lens unit in the optical axis direction. The fixed lens barrel includes a receiver configured to receive a biasing force of the biasing member transmitted to the driving ring via the rotator. The receiver is provided inside the vibrator and the rotator in the radial direction and on the first side of an end of the driving ring on the second side.

An imaging apparatus according to another aspect of the present invention includes the above lens apparatus, and an image sensor configured to photoelectrically convert light passing through the lens apparatus.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention.

Figure 1:
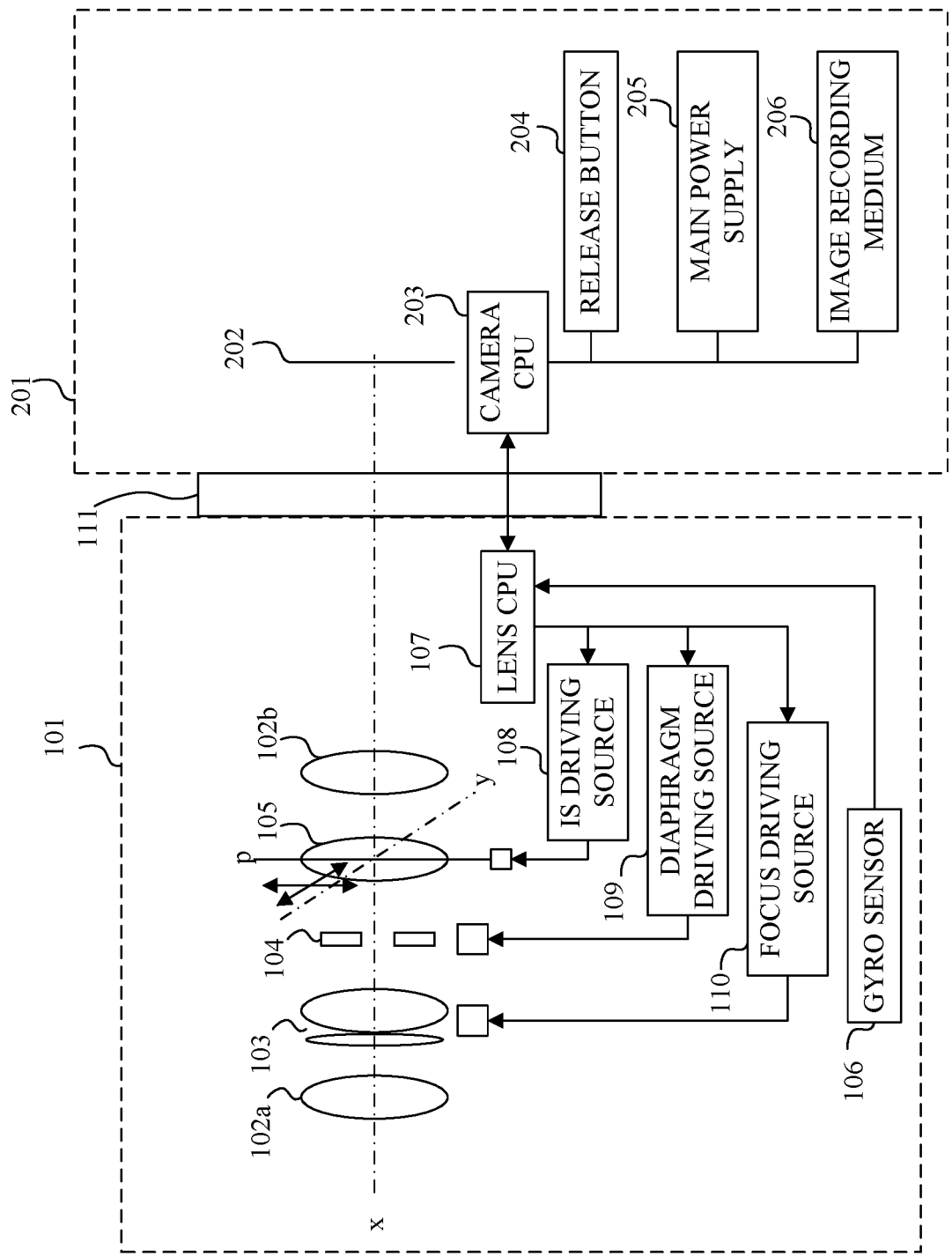
FIG. 1 illustrates configurations of an interchangeable lens and a camera according to an embodiment of the present invention.

FIG. 1 illustrates a configuration of a camera system that includes an interchangeable lens 101 as a lens apparatus according to one embodiment of the present invention, and a camera 201 to which the interchangeable lens 101 is detachably attached. The interchangeable lens 101 is attached to the camera 201 via a mount 111.

The interchangeable lens 101 has an imaging optical system that includes, in order from the object side, a first fixed lens 102a, a second fixed lens 102b, a focus lens 103, a diaphragm (aperture stop) unit 104, and an image stabilization lens 105. The imaging optical system has an optical axis x. In the following description, the direction in which the optical axis x extends will be referred to as the optical axis direction, and a radiation direction orthogonal to the optical axis direction will be referred to as the radial direction. The interchangeable lens 101 further includes a gyro sensor 106 configured to detect a lens shake due to camera shake and the like, and a lens CPU 107 configured to control and process the interchangeable lens 101.

The lens CPU 107 controls a focus driving source 110 to move the focus lens 103 in the optical axis direction and controls a diaphragm driving source 109 to change the aperture diameter of the diaphragm unit 104. The lens CPU 107 calculates a lens shake amount using a shake detection signal from the gyro sensor 106. Then, in order to reduce the image blur corresponding to a lens shake amount, the lens CPU 107 controls an image stabilization ("IS") driving source 108 to move the image stabilization lens 105 in the y direction (yaw direction) orthogonal to the optical axis x and the p direction (pitch direction).

The camera 201 has an image sensor 202 that captures (photoelectrically converts) an object image formed by a light flux that has passed through the imaging optical system. The camera CPU 203 controls a release button 204, a main power supply 205, and an image recording medium 206.

When the release button 204 is half-pressed and a first switch SW1 is turned on, the camera CPU 203 starts an imaging preparatory operation, such as a light metering operation, an autofocus operation, and an image stabilization operation. When the release button 204 is fully pressed and a second switch SW2 is turned on, the camera CPU 203 performs imaging for recording, generates a captured image, and records the captured image in an image recording medium 206.

The camera CPU 203 and the lens CPU 107 communicate with each other via unillustrated communication contacts provided in the mount 111. A main power supply 205 supplies the power to the interchangeable lens 101 via illustrated power supply contacts provided in the mount 111.

Referring now to FIGS. 2, 3, 4, 5, and 6, a description will be given of the configuration of the focus driving unit 320 provided in the interchangeable lens 101. 2, 3 and 4 illustrate sections of the focus driving unit 320 taken at different positions in the direction around the optical axis (referred to as a circumferential direction hereinafter).

A base ring 325 as a fixed ring includes, in order from an image side (first side) to the object side (second side) in the optical axis direction, a ring-shaped vibration type motor as the focus driving source 110 and a scale ring 326 on an outer circumferential portion located outside of the base ring 325 in the radial direction. The base ring 325 further includes a cam ring (driving ring) 322, a guide barrel (barrel member) 321, the focus lens 103, and a focus retaining frame 312 retaining the focus lens 103 on the inner circumferential portion side located outside of the base ring 325 in the radial direction. The guide barrel 321 is a fixed lens barrel integrated with the base ring 325. The cam ring 322 is disposed rotatably in the circumferential direction between the guide barrel 321 and the base ring 325. The guide barrel 321 protrudes in a flange shape at a portion closest to the object the outside of the base ring 325 in the radial direction.

Cam follower pins 312a are provided at three positions in the circumferential direction of the focus retaining frame 312. Linear movement groove portions 321a extending in the optical axis direction are provided at three positions in the circumferential direction of the guide barrel 321. Each cam follower pin 312a is engaged with each linear movement groove portion 321a. Thereby, the focus retaining frame 312 is guided in the optical axis direction.

The cam ring 322 is disposed inside the guide barrel 321 in the radial direction and rotatable in the circumferential direction. The cam ring 322 has three cam groove portions 322a with each of which the three cam follower pins 312a are engaged, respectively. When the cam ring 322 rotates in the circumferential direction, the focus retaining frame 312 moves in the optical axis direction by the cam action for each cam groove portion 322a in each cam follower pin 312a.

The vibration type motor has a stator 332 as a vibrator made of a piezoelectric element (electromechanical energy conversion element) and an elastic body, and a rotor 331 as a rotator that contacts the elastic body of the stator 332. The stator 332 is held by a stator retaining ring 370, which is integrated with the base ring 325.

The vibration type motor has a pressure spring (compression biasing member) 353 that biases the stator 332 from the image side to the object side and compressively brings the stator 332 into contact with the rotor 331. When a periodic signal such as two pulsed signals having different phases is applied to the piezoelectric element, the piezoelectric element periodically deforms and excites a vibration (such as an elliptical motion) on the surface of the stator 332. The rotor 331 that compressively contacts the stator 332 from which the vibration is excited is rotationally driven in the direction around the optical axis. In other words, a rotational force is generated from the vibration type motor.

The rotor 331 is coupled to an interlock ring 330 integrally rotatably in the circumferential direction by the adhesive force of a rubber ring 333. The interlock ring 330 is coupled to the cam ring 322 integrally rotatably in the circumferential direction by the adhesive force of a rubber ring 352. In other words, the rotor 331, the interlock ring 330, and the cam ring 322 rotate together.

Figure 5:
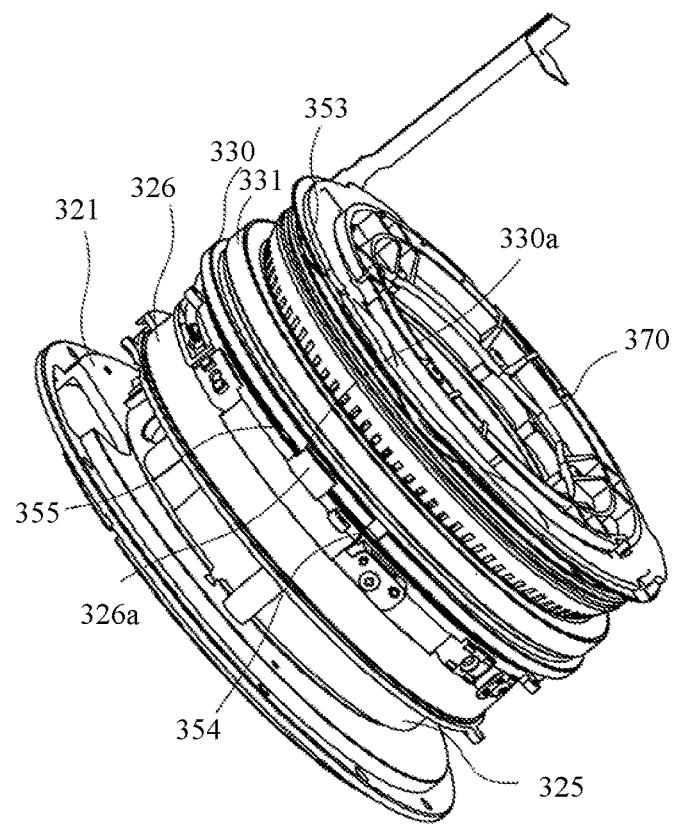
FIG. 5 is a perspective view of the focus driving unit.
Figure 6:
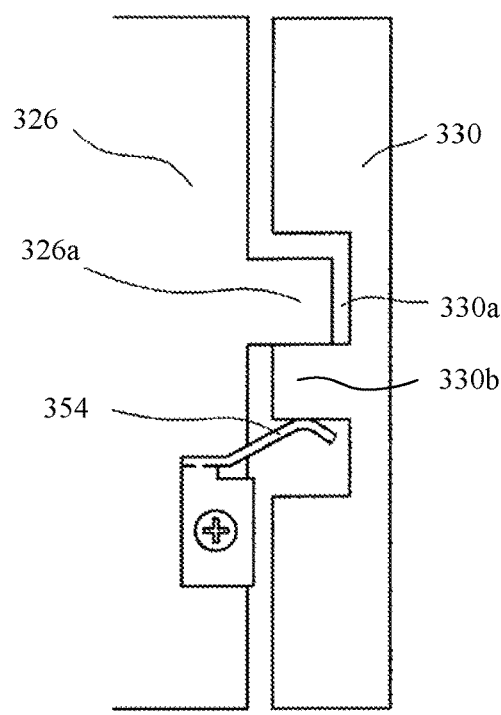
FIG. 6 is a top view of a connecting portion in the focus driving unit.

The scale ring (retaining ring) 326 is rotatable in the circumferential direction relative to the base ring 325. The scale ring 326 has a key portion (transmitted portion) 326a extending to the image side at one or more positions in the circumferential direction. As illustrated in FIGS. 5 and 6, the key portion 326a is engaged with a concave portion 330a formed in the interlock ring 330. The circumferential width of the concave portion 330a is larger than that of the key portion 326a. In other words, a space in the circumferential direction is originally provided between the key portion 326a and the concave portion 330a.

A plate spring 354 as a first biasing member is fixed onto the scale ring 326 by a screw. The scale ring 326 is biased to one side (lower side in FIG. 6) in the circumferential direction by a reaction force generated when the plate spring 354 contacts a convex portion 330b adjacent to the concave portion 330a in the interlock ring 330. Thereby, in the circumferential direction, the key portion 326a contacts (or is pressed against) the inner surface of the concave portion 330a. In other words, the convex portion 330b in the interlock ring 330 is sandwiched between the key portion 326a and the plate spring 354. Due to this configuration, even when there is an axial shift between the interlock ring 330 (or the cam ring 322) and the scale ring 326, the plate spring 354 is deformed and the axial shift is absorbed. Even when the rotation direction of the vibration type motor or the rotation direction of the interlock ring 330 is reversed, the scale ring 326 does not lag behind the interlock ring 330 by a space between the key portion 326a and the concave portion 330a, and can integrally reverse in the rotation direction.

A radial ball bearing portion includes a plurality of balls 350 arranged in the circumferential direction and is provided near the image-side ends of the guide barrel 321 and the cam ring 322. The ball 350 is a steel ball as a rotation member that is rotatable. As a configuration of the radial ball bearing portion, the guide barrel 321 has a ball race surface 321b as a first contacting surface which is inclined by 45° to the optical axis x and faces the image side and outside the guide barrel 321 in the radial direction. The cam ring 322 has a ball race surface 322b which serves as a second contacting surface as a surface inclined by 45° to the optical axis x and facing the object side and the inside the cam ring 322 in the radial direction, and a ball race surface 322c as a third contacting surface facing the image side and inside the cam ring 322 in the radial direction. The ball race surface 322b of the cam ring 322 is positioned on the side opposite to the ball race surface 321b of the guide barrel 321 via the ball 350.

A female threaded portion 351a in a ball race member 351 as a ring member is screwed from the image side to a male threaded portion 321c provided on the outer circumference of the image-side end portion of the guide barrel 321. The ball race member 351 has a ball race surface 351a that is a fourth contacting surface serving as a surface inclined by 45° to the optical axis x and facing the object side and outside the ball race member 351 in the radial direction. The ball race surface 351a of the ball race member 351 is located on the side opposite to the ball race surface 322c of the cam ring 322 via the ball 350.

Before the ball race member 351 is attached to the guide barrel 321, the balls 350 are inserted between the three ball race surfaces 321b, 322b, and 322c, and then the female threaded portion 351a on the ball race member 351 is inserted into the male threaded portion 321c on the guide barrel 321 and tightened. Thereby, the balls 350 contact the four ball race surfaces 321b, 322b, 322c, and 351a and are held so as to roll in the circumferential direction. Due to this configuration, the cam ring 322 is steadily held in the optical axis direction relative to the guide barrel 321, and can rotate in the circumferential direction at a fixed position in the optical axis direction.

Figure 2:
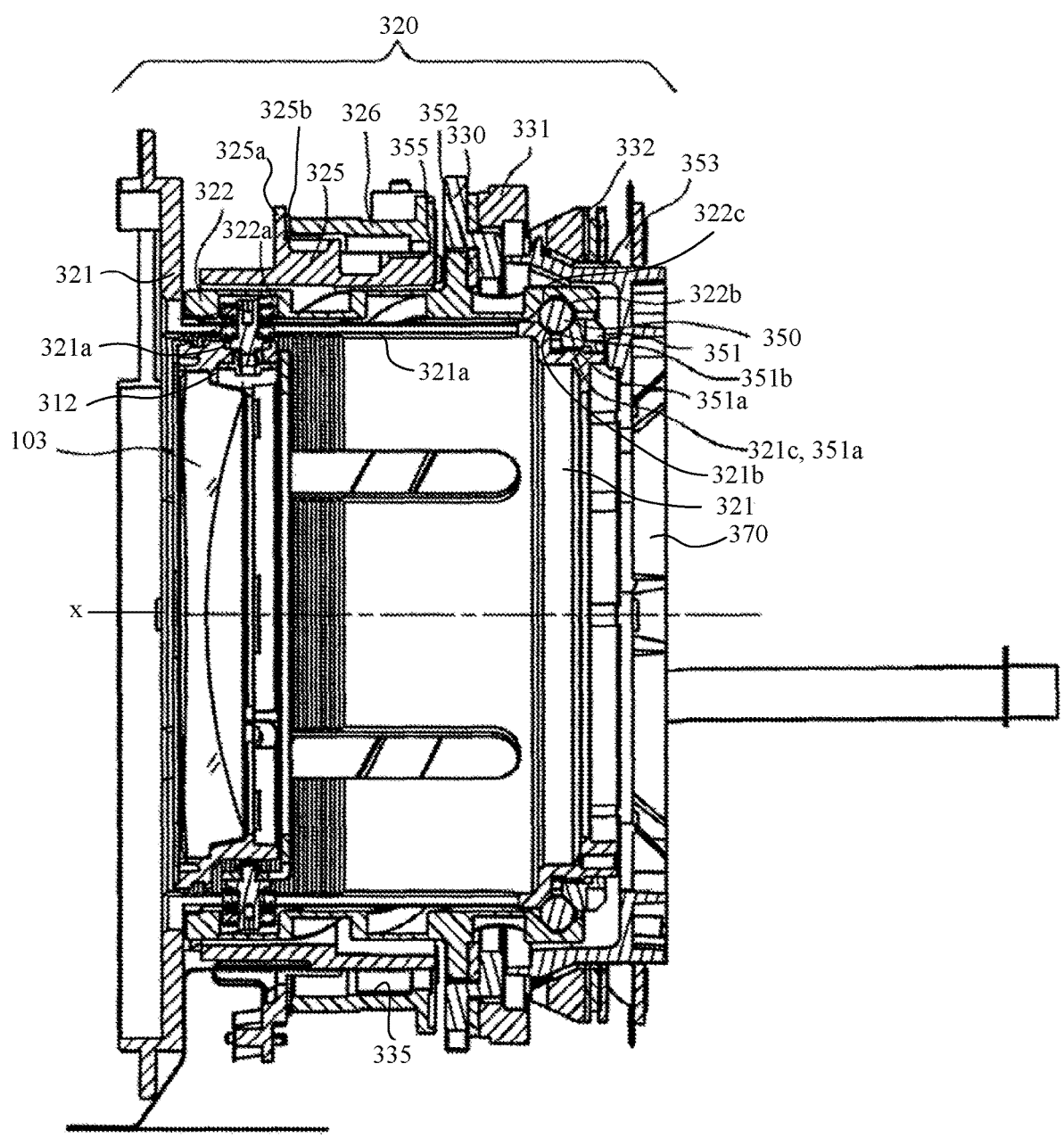
FIG. 2 is a sectional view of a focus driving unit in the interchangeable lens according to the embodiment.
Figure 3:
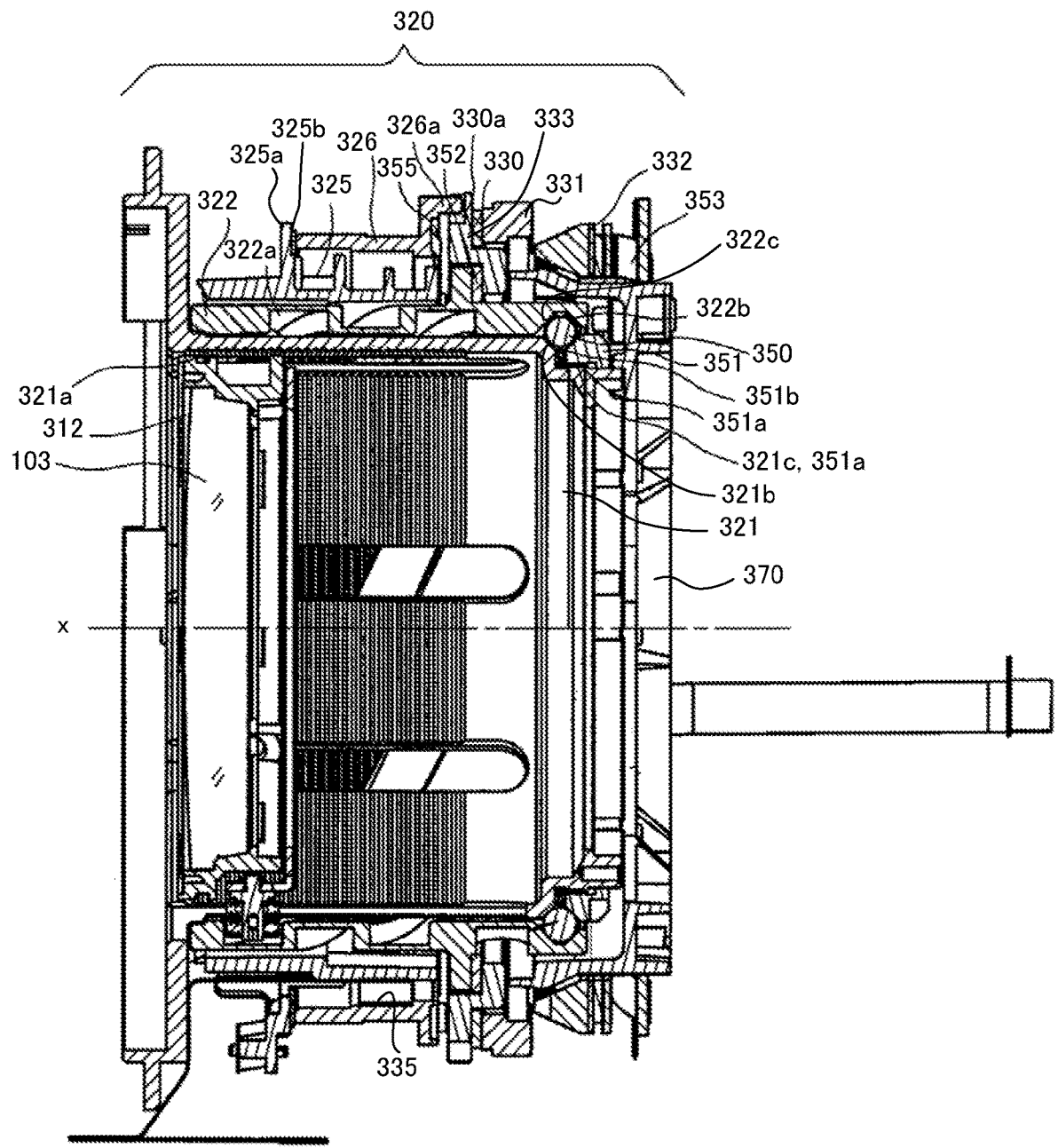
FIG. 3 is another sectional view of the focus driving unit.

The above pressure spring 353 biases the stator 332 in the left direction (on the object side) in FIG. 2. The biasing force is transmitted to the stator 332, the rotor 331, the interlock ring 330, the cam ring 322, and the balls 350, and received by the guide barrel 321 as the barrel member fixed onto the base ring 325 at the ball race surface 321b. Thus, the pressure spring 353 serves to generate a compression force between the stator 332 and the rotor 331 for the vibration type motor, and to bias the cam ring 322 against the guide barrel 321. This configuration can suppress the space (or provide positioning) in the optical axis direction and the radial direction of the cam ring 322 relative to the guide barrel 321, and consequently suppress the deteriorated position accuracy of the focus lens unit in the optical axis direction and the deformation in the radial direction.

Since a single pressure spring 353 provides the compression in the vibration type motor and biases the cam ring 322 on one side, the number of components can be reduced as compared with the case where they are performed by separate biasing components and the focus driving unit and the interchangeable lens 101 can be made smaller.

This embodiment provides the radial ball bearing portion inside the stator 332 and the rotor 331 in the radial direction and on the image side of the end of the cam ring 322 on the object side. More specifically, the radial ball bearing portion is closer to the image side than the rotor 331. At least part of the radial ball bearing portion is provided within a range where the stator 332 is provided in the optical axis direction (or inside the stator 332). The radial ball bearing portion may be provided at least partly within the range where the rotor 331 is provided in the optical axis direction (or inside the rotor 331).

The radial ball bearing portion is provided inside the vibration type motor in the radial direction and on the image side of the end of the cam ring 322 on the object side, and can reduce the length of the focus driving unit in the optical axis direction in comparison with the case where the bearing portion is provided at the end portion of the cam ring on the object side. As a result, the size of the interchangeable lens can be reduced.

A flexible and band-shaped reflective film scale 335 is fixed (pasted) on the inner circumferential surface of the scale ring 326. The film scale 335 has a reflective pattern used to detect a position. The film scale 335 constitutes an optical encoder together with a sensor head 336 which will be described later.

Figure 4:
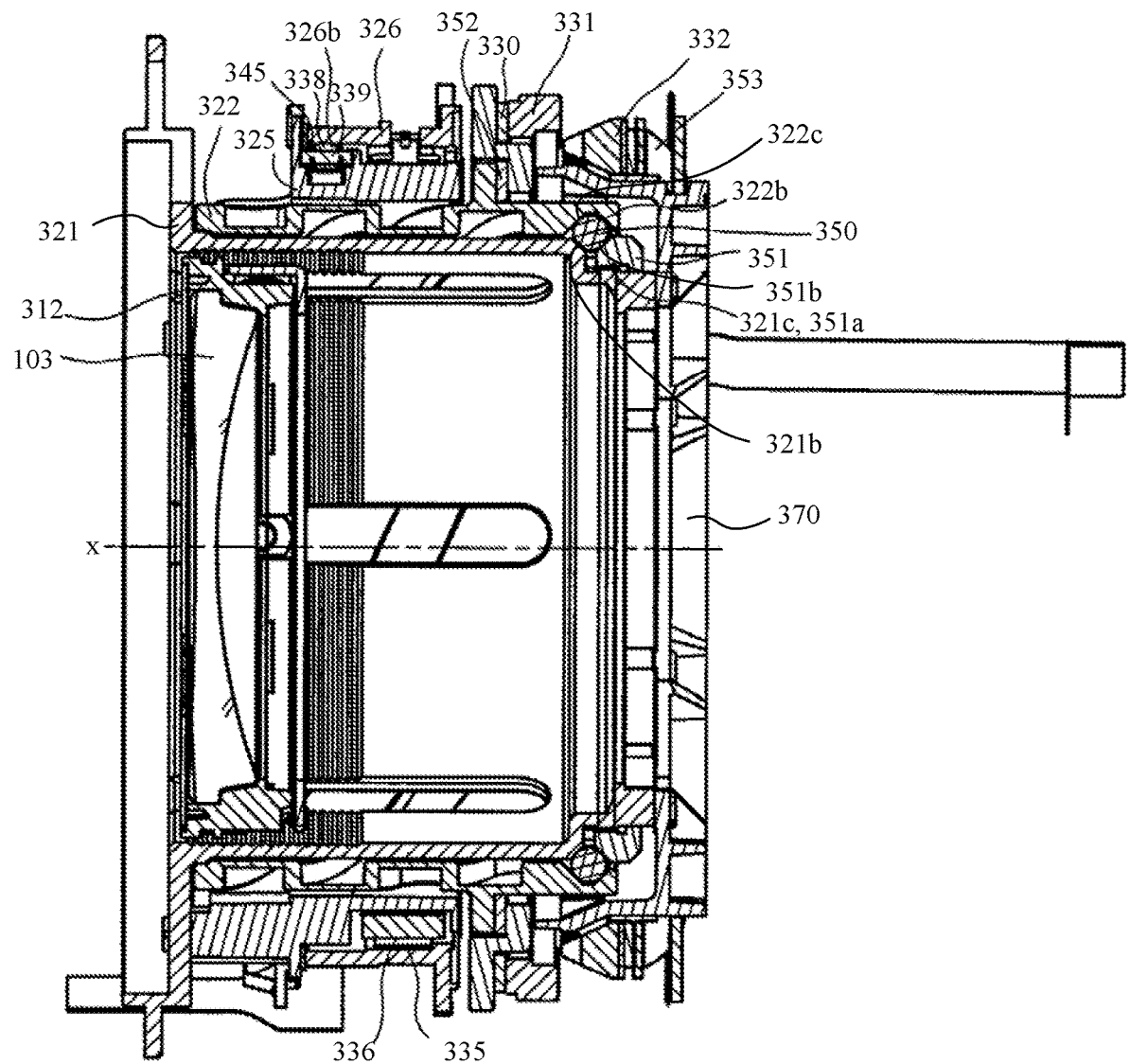
FIG. 4 is still another sectional view of the focus driving unit.

The sensor head 336 illustrated in FIG. 4 has a light emitter for emitting light to the film scale 335 and a light receiver for receiving the reflected light from the reflective pattern on the film scale 335. The light receiver photoelectrically converts the received reflected light and outputs a detection signal. The sensor head 336 is fixed on the base ring 325 by the adhesion or the like.

As illustrated in FIG. 4, guide rollers 338 are rotatably held by the roller holder 345 around a roller shaft 339 at three circumferential positions on the outer circumferential portion of the base ring 325. The guide roller 338 contacts and holds the inner circumferential surface 326b of the scale ring 326 so as to make it rotatable in the circumferential direction. One guide roller 338 provided on the opposite side of the sensor head 336 with respect to the optical axis x among the three guide rollers 338 is spring biased to the radially outside as described later. Thereby, the scale ring 326 can be radially biased so as to maintain the distance between the sensor head 336 and the film scale 335.

Figure 7A:
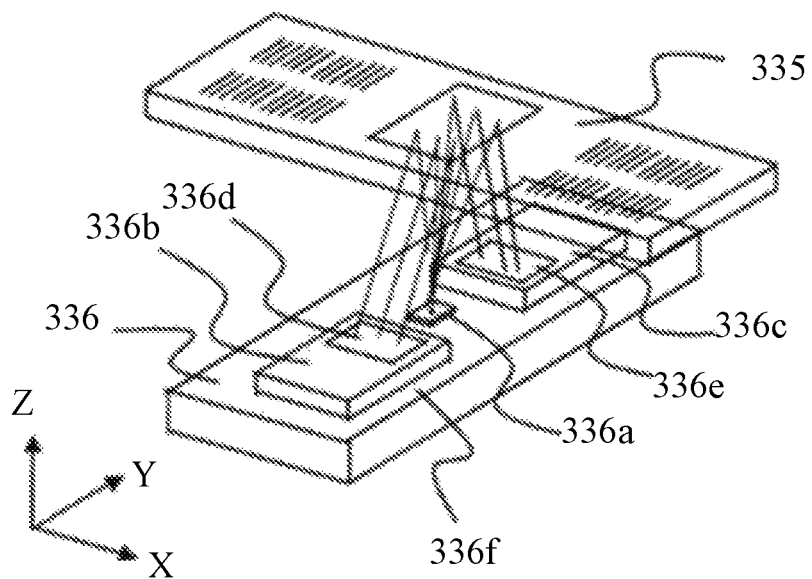
FIGS. 7A and 7B illustrate an encoder according to one embodiment.
Figure 7B:
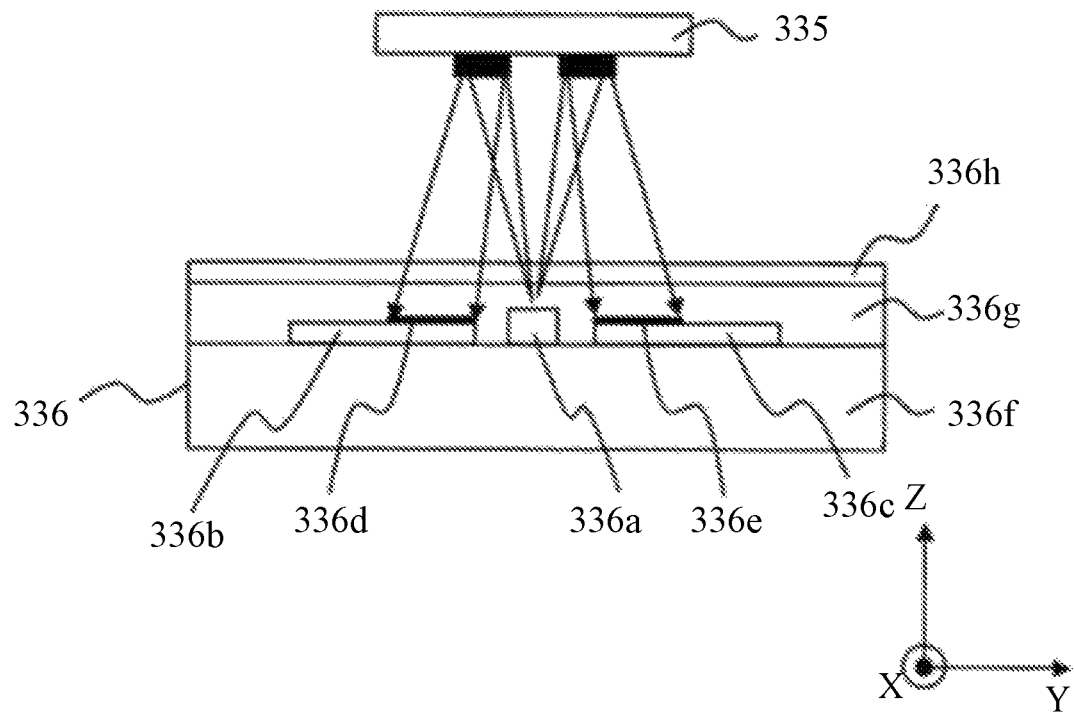

Referring now to FIGS. 7A and 7B to FIGS. 10A to 10C, a detailed description will be given of a more detailed configuration of the optical encoder and the position detection principle. This embodiment uses an absolute encoder capable of detecting the absolute position in the circumferential direction. FIG. 7A illustrates the encoder viewed from an oblique direction, and FIG. 7B illustrates a section of the encoder. FIG. 8A illustrates the film scale (simply referred to as a scale hereinafter) 335 viewed from the sensor head side, and FIG. 8B illustrates partially enlarged the scale 335. FIGS. 7A, 7B, 8A, and 8B illustrate the scale 335 as a plane, but actually it is curved along the inner circumferential surface of the scale ring 326. In FIGS. 7A and 7B, the Y axis as the coordinate axis corresponds to the optical axis direction, the X axis corresponds to the circumferential direction, and the Z direction corresponds to the radial direction.

As illustrated in FIGS. 7A and 7B, the scale 335 and the sensor head 336 are arranged opposite to each other. The scale 335 is movable in the X axis direction relative to the sensor head 336. The light emitter 336a includes an LED chip or the like. Two photo chip ICs 336b and 336c contain light receivers 336d and 336e and signal processing circuits. The photo chip ICs 336b and 336c are mounted on a printed board 336f and the photo chip ICs 336b and 336c and the light emitter 336a are covered with transparent resin 336g. An upper surface (on the scale side) of the transparent resin 336g is covered with a protective glass 336h.

Figure 8A:
FIGS. 8A and 8B explain a scale in the encoder.
Figure 8B:
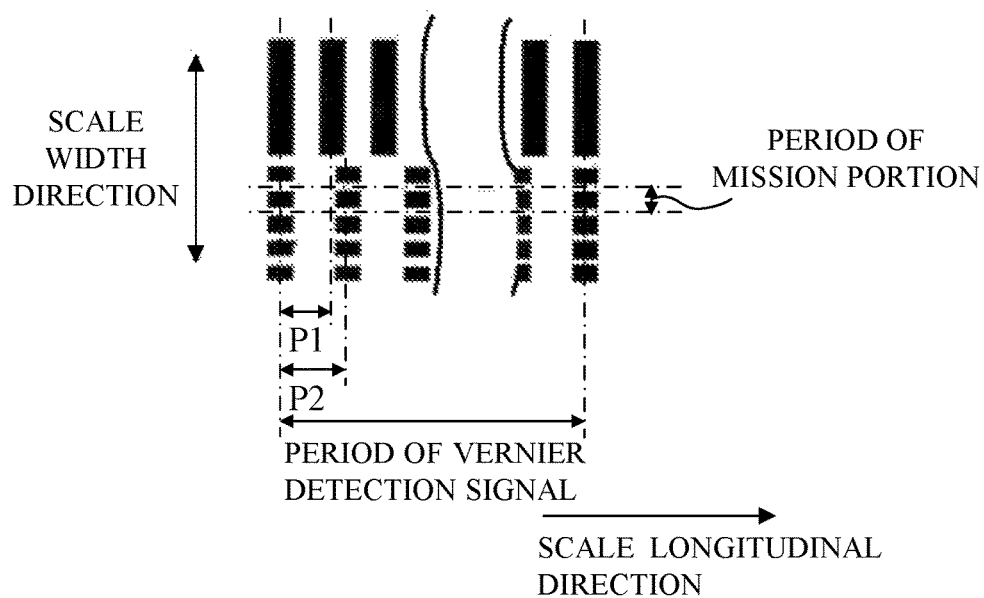

As illustrated in FIG. 8A, the scale 335 has a reflective pattern with a predetermined cycle (pitch). The reflective pattern is formed by a reflective film. The scale 335 has a first track 335a and a second track 335b that have different reflective patterns. The reflective pattern 335c of the first track 335a is formed at a pitch P1 and the reflective pattern 335d of the second track 335b is formed at a pitch P2 larger than the pitch P1. In the reflective pattern 335d, the reflective portion and the missing portion alternate in the scale width direction (optical axis direction), and the width (or the reflective area) of the reflective portion in the scale longitudinal direction (circumferential direction) changes in the scale longitudinal direction.

As illustrated in FIGS. 7A and 7B, the light emitted from the light emitter 336a is irradiated onto the scale 335. The light reflected by the first track 335a (reflective pattern 335c) on the scale 335 is received by the light receiver 336d. The light receiver 336e receives the light reflected by the second track 335b (the reflective pattern 335d) on the scale 335. The light amount emitted from the light emitter 336a is controlled in accordance with the light amount received by the light receiver 336c or 336d, so that variation in the received light amount is suppressed.

Figure 9:
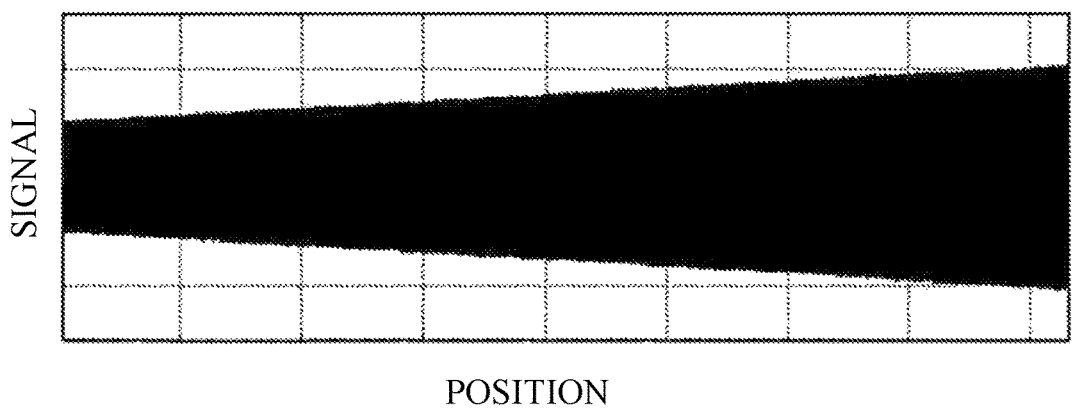
FIG. 9 illustrates a detection signal output from a sensor head in the encoder.

FIG. 9 illustrates an illustrative detection signal output from the light receiver 336e that has received the reflected light from the second track 335b. The amplitude of the detection signal changes in accordance with the change in the reflective area of the reflective pattern 335*d* in the longitudinal direction on the scale.

A plurality of light receiving elements are arranged in the scale longitudinal direction on each of the light receivers 336*d* and 336*e*. The light receiver 336*d* is configured to generate two sine signals having a period corresponding to a pitch P1 and phases different from each other by 90° based on the outputs of the plurality of light receiving elements. The light receiver 336*e* is configured to generate two sine signals having a period corresponding to a pitch P2 and phases different from each other by 90° based on the outputs of the plurality of light receiving elements.

Figure 10A:
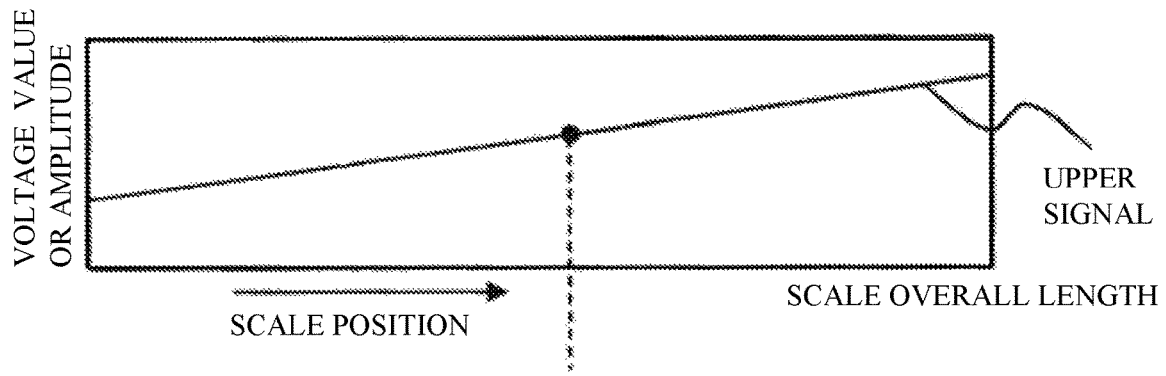
FIGS. 10A to 10C explain the principle of detecting an absolute position by the encoder according to the embodiment.
Figure 10B:
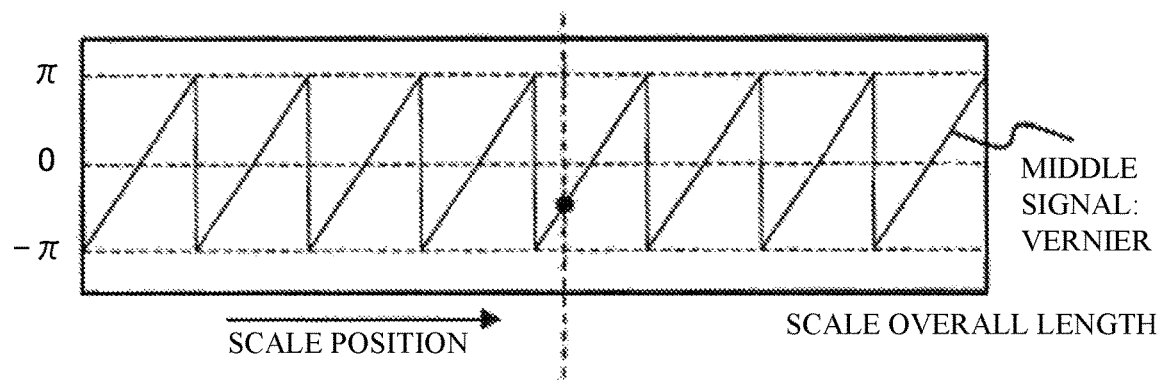
Figure 10C:
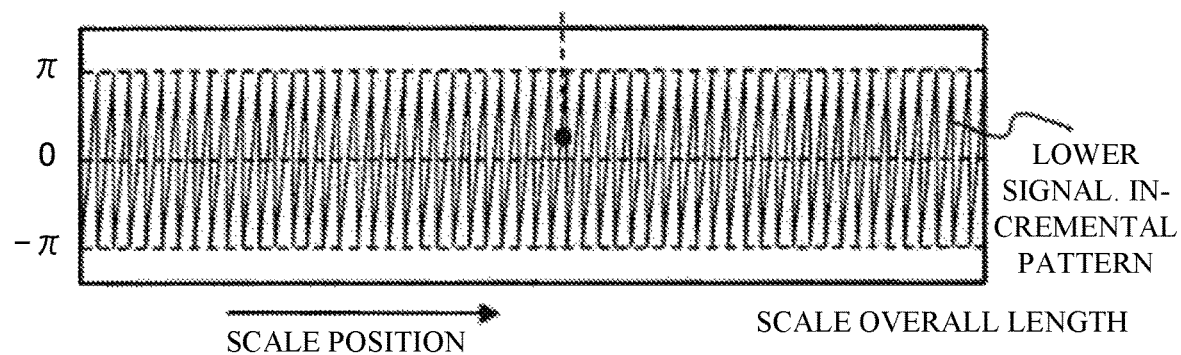

FIGS. 10A to 10C illustrate the principle of detecting the absolute position by the encoder configured as described above. FIG. 10C illustrates a lower signal. This lower signal is a periodic signal that repeats a change of a signal value between −π and +π obtained by an arctangent transformation to two sine signals that have phases shifted from each other by 90° generated by the light receiver 336*d*. Similarly, a lower signal is obtained which repeats a change of the signal value between −π and +π by the arctangent conversion to the two sine signals that are generated by the light receiver 336*e* and have phases shifted by 90° from each other generated by the light receiver 336*e*.

FIG. 10B illustrates a middle signal as a periodic signal obtained by subtracting one of the lower signals obtained from the light receivers 336*d* and 336*e* from the other. FIG. 10A illustrates an upper signal corresponding to the amplitude illustrated in FIG. 9.

The absolute position is obtained by specifying based on the signal value of the upper signal, which number of the periodic signal the current middle signal is, and by specifying based on the signal value of the middle signal, which number of periodic signal the current lower signal is.

In order to accurately detect the rotational position (rotation angle) of the scale ring 326 relative to the base ring 325 through the encoder configured as described above, it is important to maintain the distance between the scale 335 and the sensor head 336. It is thus necessary to rotatably hold the scale ring 326 so that its rotation center axis does not displace relative to the base ring 325.

Figure 11A:
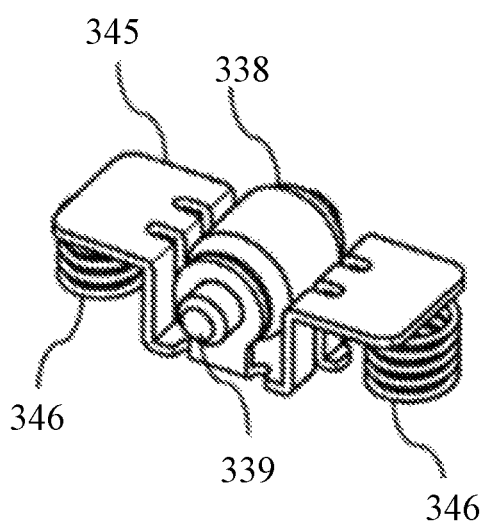
FIGS. 11A and 11B are perspective views of a guide rollers according to the embodiment.
Figure 11B:
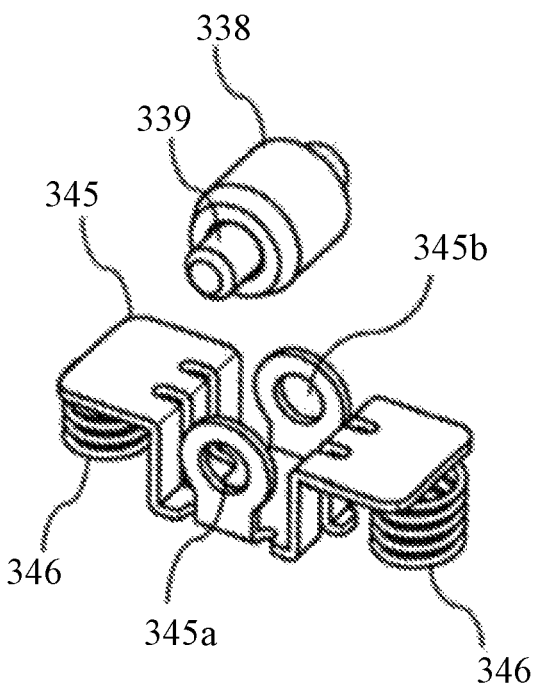

Two roller shafts 339 among the three guide rollers 338 described above are fixed on the base ring 325. FIGS. 11A and 11B illustrate the retaining structure in one guide roller (referred to as a biasing guide roller hereinafter) 338 disposed on the side opposite to the sensor head 336 with respect to the optical axis x illustrated in FIG. 4

The guide roller holder 345 holds the roller shaft 339 of the biasing guide roller 338 in the two hole portions 345*a* and 345*b*. Two compression coil springs (third biasing members) 346 are disposed between the guide roller holder 345 and the base ring 325. This retaining structure biases the biasing guide roller 338 with the guide roller holder 345 in the radial direction to the outside of the base ring 325. Thereby, the inner circumferential surface 326*b* on the scale ring 326 contacts the three guide rollers 338, and the scale ring 326 can rotate at a fixed position relative to the base ring 325 while its rotational central axis does not displace.

A thrust spring (second biasing member) 355 attached to the end portion of the base ring 325 on the image side compresses the scale ring 326 to the object side, and the end portion of the scale ring 326 on the object side against the wall portion 325*a* in the base ring 325. Thereby, the scale ring 326 is positioned relative to the base ring 325 in the optical axis direction. A slide ring 325*b* for reducing the rotational resistance of the scale ring 326 is disposed between the end of the scale ring 326 on the object side and the wall portion 325*a* in the base ring 325. This configuration enables the scale ring 326 to rotate at a fixed position in the optical axis direction relative to the base ring 325.

Hence, the scale ring 326 is positioned relative to the base ring 325 in the radial direction by the biasing force of the compression coil spring 346, and is further positioned in the optical axis direction by the biasing force of the thrust spring 355. Thus, the positional relationship between the scale 335 and the sensor head 336 can be accurately retained, and the rotational position detecting accuracy of the encoder can be improved. The biasing force of the plate spring 354 can remove the space in the circumferential direction between the scale ring 326 and the interlock ring (interlock member) 330 or the cam ring 322. This configuration can reduce the error between the detection result of the rotational position by the encoder and the actual rotational position of the cam ring 322, and consequently improve the detection accuracy of the position of the focus lens unit driven by the cam ring 322 in the optical axis direction.

The magnitude of the biasing force of each of the plate spring 354, the compression coil spring 346, and the thrust spring 355 is set so as not to twist on the scale ring 326 by these biasing forces.

More specifically, the thrust spring 355 generates the biasing force for biasing the scale ring 326 in the optical axis direction. Then, a retaining force for retaining the scale ring 326 in the radial direction orthogonal to the optical axis is generated by the frictional force between the biasing force thrust spring 355 and the contacting portion of the scale ring 326. The biasing force of the compression coil spring 346 is set to a biasing force larger than the above retaining force. This is because if the biasing force of the compression coil spring 346 is smaller than the retaining force, the scale ring 326 cannot properly contact the guide roller 338 and the scale ring 326 would incline to the base ring 325 or causes a displacement.

This embodiment can set small the biasing forces of the plate spring 354, the compression coil spring 346, and the thrust spring 355, since the scale ring 326 itself may be retained rotatably at the fixed position. This is because the scale ring 326 is connected to the interlock ring 330, substantially integrally rotates, and never burdens a load when the cam ring is driven through the scale ring 326. Thus, the abrasion and the increased driving load in the focus driving unit by the biasing force can be suppressed. This configuration can realize a highly durable interchangeable lens that can detect the position of the focus lens unit with a high detection accuracy.

This embodiment has described the rotation of the vibration type motor transmitted to the cam ring 322 via the interlock ring 330 as a separate member from the cam ring 322, but the rotation of the vibration type motor may be directly transmitted to the cam ring. In other words, it is unnecessary to provide the interlock ring 330.

This embodiment has described the circumferential space between the scale ring 326 and the connecting ring 330 removed by the plate spring 354, but the scale ring 326 and the connecting ring 330 may be integrated by the elastic adhesive agent.

This embodiment uses the radial ball bearing structure that contacts the ball 350 through the contacting surface (ball race surface) inclined to the optical axis direction, but the contacting surface with the balls provided on the cam ring may be a plane orthogonal to the optical axis. Even this structure can receive the biasing force of the pressure spring and suppress the space in the optical axis direction between the cam ring and the guide barrel. The engagement between the outer circumferential surface of the guide barrel and the inner circumferential surface of the cam ring so as not to generate the resistance in the rotation of the cam ring can remove the space in the radial direction of the cam ring relative to the guide barrel.

This embodiment has discussed the scale 335 retained by a rotatable scale ring (retaining ring) 326 and the sensor head 336 retained by the base ring (fixed ring) 325. However, the sensor may be retained on a rotatable retaining ring and the scale may be held on the fixed ring.

This embodiment has described the interchangeable lens used in the lens interchangeable type camera system, but the same configuration as this embodiment is applicable to the lens barrel for the lens integrated type camera (still camera or video camera).

The above embodiment can provide the lens apparatus having a smaller length in the optical axis direction with a structure that receives the biasing force for compressively bringing the vibrator and the rotator into contact with each other in the vibration type motor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-80360, filed on Apr. 19, 2018, which is hereby incorporated by reference herein in its entirety.

What is claimed is:

1. A lens apparatus comprising:
a fixed lens barrel;
a lens unit provided inside the fixed lens barrel in a radial direction and movable in an optical axis direction of the lens unit;
a vibrator configured to generate a vibration excited by an electromechanical energy conversion;
a rotator configured to rotate around the optical axis direction in a case that the rotator contacts the vibrator vibrated;
a biasing member configured to bias the vibrator from a first side to a second side in the optical axis direction so as to bring the vibrator into compressive contact with the rotator; and
a driving ring configured to receive a rotation of the rotator, to rotate around the optical axis direction relative to the fixed lens barrel, and to move the lens unit in the optical axis direction,
wherein the fixed lens barrel includes a receiver configured to receive a biasing force of the biasing member transmitted to the driving ring via the rotator, and
wherein the receiver is provided inside the vibrator and the rotator in the radial direction and on the first side of an end of the driving ring on the second side.

2. The lens apparatus according to claim 1, wherein the receiver is provided on the first side of the rotator.

3. The lens apparatus according to claim 1, wherein the receiver is provided in a range where the vibrator is provided in the optical axis direction or on the first side of the vibrator.

4. The lens apparatus according to claim 1, wherein the receiver includes:
a rotating member that is rotatable;
a first contacting surface provided on the fixed lens barrel and configured to contact the rotating member; and
a second contacting surface provided on the driving ring and configured to contact the rotating member on a side opposite to the first contacting surface via the rotating member,
wherein each of the first and second contacting surfaces inclines to the optical axis direction.

5. The lens apparatus according to claim 4, wherein the rotator includes:
a third contacting surface provided as a surface inclined to the optical axis direction on the driving ring and configured to contact the rotating member; and
a fourth contacting surface provided on the ring member attached to the fixed lens barrel from the first side and configured to contact the rotating member on the side opposite to the third surface via the rotating member.

6. The lens apparatus according to claim 1, wherein the receiver positions the driving ring relative to the fixed lens barrel in the optical axis direction and in a radial direction orthogonal to the optical axis direction.

7. An imaging apparatus comprising:
a lens apparatus; and
an image sensor configured to photoelectrically convert light passing through the lens apparatus,
wherein the lens apparatus includes;
a fixed lens barrel;
a lens unit provided inside the fixed lens barrel in a radial direction and movable in an optical axis direction of the lens unit;
a vibrator configured to generate a vibration excited by an electromechanical energy conversion;
a rotator configured to rotate around the optical axis direction in a case that the rotator contacts the vibrator vibrated;
a biasing member configured to bias the vibrator from a first side to a second side in the optical axis direction so as to bring the vibrator into compressive contact with the rotator; and
a driving ring configured to receive a rotation of the rotator, to rotate around the optical axis direction relative to the fixed lens barrel, and to move the lens unit in the optical axis direction,
wherein the fixed lens barrel includes a receiver configured to receive a biasing force of the biasing member transmitted to the driving ring via the rotator, and
wherein the receiver is provided inside the vibrator and the rotator in the radial direction and on the first side of an end of the driving ring on the second side.

* * * * *